Figure 1:
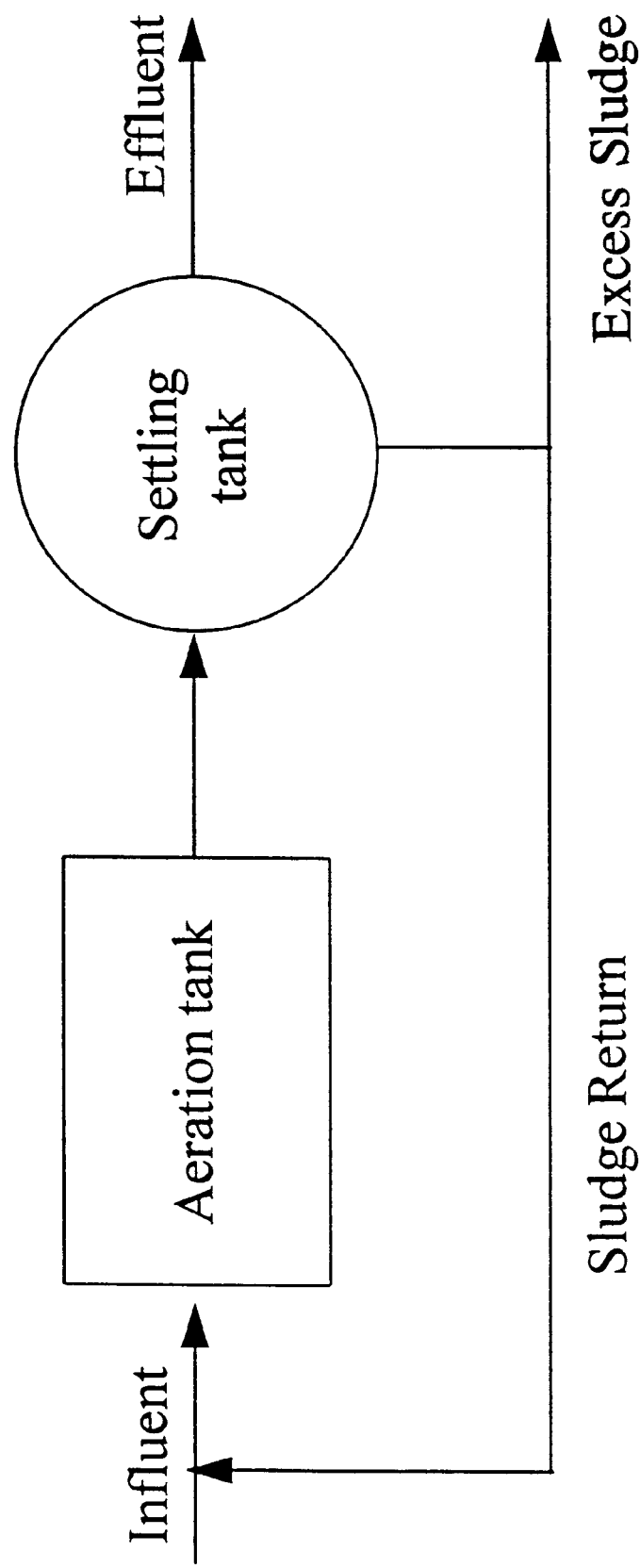

United States Patent [19]
Helmo et al.

[11] Patent Number: 5,906,746
[45] Date of Patent: May 25, 1999

[54] METHOD FOR THE CONTROL OF BIODEGRADATION

[75] Inventors: Kim Helmo, Karlslunde; Nicolas Heinen, Lyngby, both of Denmark

[73] Assignee: BioBalance A/S, Brondby, Denmark

[21] Appl. No.: 08/750,367

[22] PCT Filed: May 2, 1996

[86] PCT No.: PCT/DK96/00205

§ 371 Date: May 9, 1997

§ 102(e) Date: May 9, 1997

[87] PCT Pub. No.: WO96/35644

PCT Pub. Date: Nov. 14, 1996

[30] Foreign Application Priority Data

May 11, 1995 [DK] Denmark .................................. 0545/95

[51] Int. Cl.$^6$ ...................................................... C02F 3/30
[52] U.S. Cl. ........................ 210/614; 210/626; 210/630; 210/903
[58] Field of Search ................................. 210/605, 614, 210/620, 626, 630, 903

[56] References Cited

U.S. PATENT DOCUMENTS

| | | | |
|---|---|---|---|
| 5,019,266 | 5/1991 | Soeder et al. | 210/614 |
| 5,180,494 | 1/1993 | Yamaguchi et al. | 210/614 |
| 5,296,147 | 3/1994 | Koster et al. | 210/614 |
| 5,304,308 | 4/1994 | Tsumura et al. | 210/614 |
| 5,401,412 | 3/1995 | Yang et al. | 210/614 |
| 5,447,633 | 9/1995 | Matsche et al. | 210/903 |
| 5,506,096 | 4/1996 | Helmo | 210/614 |
| 5,624,562 | 4/1997 | Scroggins | 210/605 |
| 5,624,564 | 4/1997 | Lefevre et al. | 210/614 |

FOREIGN PATENT DOCUMENTS

| | | |
|---|---|---|
| 3712433 | 10/1988 | Germany . |
| 3925091 | 1/1991 | Germany . |
| 4024947 | 2/1992 | Germany . |
| 61-118195 | 6/1986 | Japan . |
| 9503254 | 2/1995 | WIPO . |

OTHER PUBLICATIONS

Helmo. K., "Biologisk iltregulering," Stads—og Haveingenioren 10, pp. 56–59 (1993). (with translation).

*Primary Examiner*—Christopher Upton
*Attorney, Agent, or Firm*—Frommer Lawrence & Haug LLP; Thomas J. Kowalski

[57] ABSTRACT

A novel method for control of biodegradation is disclosed, said biodegradation being performed by mixed cultures of microorganisms. Measurements and adjustment (preferably on-line) of process parameters which relate to metabolic activity of the microorganisms are performed in such a manner that simultaneous nitrification and denitrification is effected in the same environment while keeping the oxygenconcentration below 1 ppm. The method allows the use of high biomass concentrations (up to 20 kg/m$^3$) and reduces energy consumption and process volume of e.g. activated sludge processes, thereby saving costs for waste water purification. Generally, the process ensures optimized conditions for microorganisms in the process. Also disclosed is a method for waste water purification and a waste water purification plant which both employ the method for control of biodegradation. Finally, a method for determining setpoint values allowing the control is also disclosed.

27 Claims, 2 Drawing Sheets

METHOD FOR THE CONTROL OF BIODEGRADATION

FIELD OF THE INVENTION

The present invention relates to a method for controlling biodegradation of aqueous media containing biodegradable material which comprises nitrogen-containing components. Further, the invention relates to methods for purifying such aqueous media. Finally, the invention pertains to a water purification plant wherein these methods are employed in the purification processes.

Documents cited herein are incorporated herein by reference.

GENERAL BACKGROUND

Today, protection of the environment is of great concern to mankind. Increasing population as well as a general demand for increased quality of life expressed as a healthy and beautiful environment and at the same time a life style based on the use of advanced technology has accentuated the need for water, especially pure water, throughout the world but especially in the industrialized parts of the world.

In highly industrialized countries, especially countries with large urban concentrations, it is necessary to treat the waste water from households and industrial production so as to avoid an unacceptable level of polluted and polluting material in the environment, i.e. in the recipients for the waste water such as lakes, rivers and other waterways, the sea, etc. The polluted and polluting material comprises a variety of substances, for example organic and inorganic substances which may or may not be decomposable in nature. Among the polluting material usually present in waste water effluents, decomposable organic matter and heavy metals are of the greatest concern.

An increasing amount of the waste water which is produced worldwide is now subjected to some kind of treatment, such treatment being of mechanical, chemical or biological nature or any combination thereof. Generally, it is expected that there will be focused even more on waste water treatment in the future as the public awareness of environmental hazards is becoming even stronger than today.

The main purpose of purifying e.g. municipal and industrial waste water is to reduce the content of biodegradable material in the waste water, i.e. to ensure that the treated waste water does not contain such amounts of biodegradable material, i.e. biodegradable organic and/or inorganic matter, that these amounts will lead to an unacceptable low level of oxygen in the recipient due to the amount of oxygen required for aerobic decomposition of degradable (organic) material.

The removal of biodegradable material is often performed by including some sort of biological treatment step in the water purification process. Normally, complex cultures of microorganisms are used to effect the biodegradation (as the microorganisms metabolize the biodegradable material and thereby use it at as source of energy) and the result is a conversion of the biodegradable material into environmentally acceptable compounds such as $CO_2$ and $N_2$.

It is especially desired to reduce the amount of organic matter and at the same time to reduce the amount nitrogen-containing components present in the waste water.

Such elimination of nitrogen-containing components from waste water has proved to be difficult and resource consuming. The goal is to convert the nitrogen bound in nitrogen-containing components of waste-water into gaseous (atmospheric) nitrogen, and this is traditionally done by the steps of nitrification (an oxidation step) and denitrification (a reduction step). Prior to these steps, complex nitrogen-containing substances are deaminated by i.a. deaminases produced by the microorganisms (or optionally supplied to the system in question) and the remaining main problem is thus to convert ammonia into gaseous nitrogen.

Numerous attempts of improving the nitrogen elimination in waste water purification has been attempted. The general scheme is the following:

Nitrification: $NH_4^+ + O_2 \rightarrow NO_3^-$

Denitrification: $NO_3^- \rightarrow N_2$ or more specifically, the nitrification involves the reaction $NH_4^+ + 2O_2 \rightarrow NO_3^- + 2H^+ + H_2O$ and the denitrification involves the reaction $NO_3^- + A_{red} \rightarrow \frac{1}{2}N_2 + A_{ox}$, wherein $A_{red}$ and $A_{ox}$ are the reduced and oxidized states, respectively, of a compound which is oxidized in parallel to the reduction of $NO_3^-$ to $N_2$.

Both reactions are facilitated by the microorganisms which are responsible for the biodegradation, but as nitrification is facilitated by high oxygen concentrations and denitrification is facilitated by low oxygen concentrations all methods known to the present inventors rely on one of two principles:

A) The biodegradation process is subjected to intermittent aeration, whereby the two processes are substantially non-simultaneous. One example of such processes is described in U.S. Pat. No. 5,304,308.

B) The biodegradation is compartmentalized, in such a way that some compartments have a high oxygen concentration whereas others have a low oxygen concentration. Examples of such processes are disclosed in EP-A-218 289 and in EP-B-233 466.

It should be clear that alternative A) is rather time consuming. The prior art processes which use this alternative are furthermore energy consuming, as the supply of oxygen to the system requires much energy for the operation of aeration pumps, means for stirring etc.

Alternative B) overcomes the problem of time-consumption on the expense of space-consumption. The mere fact that there is a spatial distribution of differently aerated zones should make it clear that much space is needed for the process to occur and therefore such processes are mainly used in large-scale water purification. Moreover, the biodegradable material must be transported from one compartment to another in order for the process to be successful, and therefore alternative B) normally requires that means for transportation are present in the system. As for alternative A), the energy requirements are high.

Both of the types of prior art processes suffer further drawbacks:

The mixed cultures of microorganisms which are responsible for the biodegradation are sensitive to changes in their environment. If the oxygen concentration is very low, the composition of the biomass will be adapted in a direction which favours anaerobic processing of biodegradable material, i.e. anaerobic bacteria will be more abundant than in an aerobic environment. The opposite is of course true for situations where the oxygen concentration is very high.

Therefore, in the known processes the composition of the mixed cultures will never or almost never be optimal with respect to neither the process of nitrification nor the process of denitrification, as a certain time is required before the cultures have been adjusted for one of the processes. In other words, large amounts of bacteria do not take part in the process which is currently "desired" at a certain point in time, as they are not capable of performing the process adequately.

Further, when using an operation which requires differences in e.g. aeration (either in time or in space) problems arise with respect to determining for how long the waste water should be processed under each of the two sets of conditions, as the incoming waste water will have to be satisfactorily nitrified in the nitrification phase before the denitrification phase is instituted. In situations were the waste water load is low, no problems will arise, but at maximum loads, the plant has to be dimensioned so that the incoming water can be stored for a sufficiently long period in both steps. In other words, purification plants operated according to the prior art methods have to be scaled for the worst possible situation, i.e. a maximum load, as all material in the polluted water which has been nitrified has to be guided into the denitrification phase.

OBJECT OF THE INVENTION

In the light of the above discussion, it is an object of the invention to provide methods to be used in the biological purification of aqueous media (such as waste water), the resulting purification being such that the amount of biodegradable material is diminished simultaneously with the elimination of nitrogen-containing components in the water without the method suffering the drawbacks of prior art methods with respect to energy demands, space consumption, etc.

DESCRIPTION OF THE INVENTION

It has surprisingly been found by the inventors that it is possible to achieve a simultaneous nitrification and denitrification in an aqueous medium containing biodegradable material which comprises nitrogen-containing components (such as e.g. waste water) which is subjected to biodegradation, without having to divide the volume into zones which favours nitrification or denitrification, respectively. This result can be achieved by carefully controlling the living conditions of the microorganisms (i.e. the metabolic activity of the microorganisms) in such a manner that their metabolic activity is kept within a narrow range which surprisingly allows the simultaneous processes of nitrification and denitrification to be effected by the microorganisms. This narrow range is system-specific and will therefore often have to be predetermined for each system wherein such a biodegradation is taking place. However, it has been discovered by the present inventors that the processes will only be efficient when the oxygen concentration is kept below 1 mg/l (below 1 ppm), even in the best stirred and oxygenated parts of the aqueous medium where microorganisms effect the processes.

The realization by the inventors that such a narrow range of metabolic activity of microorganisms exists has made possible the development of novel methods for controlling the biodegradation by microorganisms in order to optimize the efficiency of the biodegradation. Further, novel methods for the simultaneous nitrification and denitrification of aqueous media containing biodegradable material has been developed, and finally purification plants employing the said methods have also been invented.

Therefore, one part of the invention relates to a method for controlling biodegradation of biodegradable material which comprises nitrogen-containing components, the biodegradable material being contained in an aqueous medium and the biodegradation being effected by microorganisms, the method comprising assessing the value of the at least one metabolic activity parameter (assessed value) in the aqueous medium, comparing the assessed value with a predetermined range of values or a predetermined single value of at least one metabolic activity parameter which represents metabolic activity of the microorganisms which biodegrade the biodegradable material, the values in the range or the single value being ones which indicate that the microorganisms will perform a simultaneous effective nitrification and denitrification of the biodegradable material contained in the aqueous medium, and thereafter if the assessed value falls outside the range or is different from the single value, adjusting at least one parameter which has influence on the metabolic activity of the microorganisms in a direction which tends to move subsequent assessed values into the range or towards the single value and ensures that the oxygen concentration in the aqueous medium is kept below 1 mg/l while simultaneous effective nitrification and denitrification take place.

The fact that simultaneous nitrification and denitrification can be achieved at oxygen concentrations below 1 mg/l is highly surprising. It has until now been regarded as an established fact in the art that nitrification effected by microorganisms requires high concentrations of oxygen (normally above 1.5 mg/l) in order to be effective, cf German standards ATV-A 122, ATV-A 126 and ATV-A 131.

When used herein the term "method of the invention" relates to the method for controlling biodegradation, unless otherwise indicated.

It is preferred to compare with only one predetermined value, or alternatively, when using a range of values, to adjust the controlled parameter in the direction of one specific value in the range (e.g. the average value in the range).

As used herein, the term "controlling" denotes the act of regulating or deliberately influencing one or more variables of a process on the basis of measurements of one or more of the variables of the process. The latter variable(s) is/are denoted measured variable(s) whereas the first mentioned variable(s) is/are conventionally denoted (a) controlled variable(s). The desired numerical value of the controlled variable is referred to as the set point, whereas a change in any variable which may cause the controlled variable of the process to change is referred to as the load.

As used herein, the term "biodegradable material" refers to organic and/or inorganic matter which is biologically decomposable, such decomposition taking place by subjecting the organic and/or inorganic matter, especially the organic matter, to a transformation process effected by cultures of microorganisms (i.a. mixed cultures), the transformation process taking place in an aqueous environment, for example water, waste water, sewage, lake water, sea water, river water and the like. The microorganisms use the present biodegradable material as a source of nutrition and/or energy, thus converting the biodegradable material into additional biomass and to end products of metabolism such as nitrates, gaseous nitrogen, sulphates, phosphates, carbon dioxide etc.

The amount/concentration of biodegradable material in an aqueous phase is within the art of waste water purification conventionally measured in terms of Biochemical Oxygen Demand (BOD). BOD is a measure of the amount of oxygen required for aerobic decomposition of organic matters, since BOD evaluates the oxygen demand of microorganisms performing the decomposition. Alternatively, the amount/concentration of biodegradable material can be expressed as Chemical Oxygen Demand (COD). COD is also a measure of the amount of oxygen required for aerobic decomposition of organic matters, but here the oxygen demand is evaluated for a purely chemical oxidative decomposition of the organic matter. As disclosed in EP-B-461166, it is also possible to determine the amount or concentration of biodegradable material by performing fluorescence measurements of biogenic fluorophores present in microorganisms biodegrading the biodegradable material. In all aspects of the present invention wherein measurements of the amount or concentration of biodegradable material is performed, it is preferred to use the latter method for determination of the amount or concentration of biodegradable material, i.e. the method disclosed in EP-B-461166 (and in corresponding U.S. Pat. No. 5,506,096).

By the terms "nitrogen containing substances" and "nitrogen containing components" are herein meant ammonia, nitrates, nitrites, proteins, amino acids, purines, pyrimidines, nucleic acids, nucleosides, nucleotides and other organic/inorganic compounds which contain nitrogen.

The expression "biodegradation" (or biological treatment) thus relates to the process of microorganisms metabolizing biodegradable material present in an aqueous medium. In essence, such biodegradation take place inside as well as outside the microorganisms. High molecular weight compounds (such as long hydrocarbon chains) or other compounds which are not readily transported across the membranes of the microorganisms cannot readily enter the microorganisms but are instead partially degraded in the extracellular compartment by secreted enzymes. The thus resulting material can thereafter enter the cells wherein it is metabolized into energy and end-products such as $CO_2$, $N_2$ etc. In the art of waste water purification, the aqueous medium is introduced into a tank, a basin or the like normally containing mixed cultures of microorganisms, i.e. activated sludge (biomass), wherein the biodegradable material in the aqueous medium to be treated is degraded by the microorganisms present.

Thus, the expression "biodegradation being effected by microorganisms" reflects the fact that the microorganisms are responsible for the conversion of the biodegradable material in either of the above-described ways.

The term "aqueous medium" as used herein refers to a liquid containing water as the basic predominant constituent, preferably more than 80% by weight, more preferably more than 90% by weight, especially more than 96% by weight, for example more than 97% by weight, most preferably more than 99% by weight, of water, the liquid being capable of acting as solvent and/or dispersing medium and thereby being capable of comprising soluble and/or insoluble and/or suspended and/or dispersed substances, material and/or mixed cultures of microorganisms as defined herein.

Often, the aqueous medium will according to the invention be selected from waste water such as municipal waste water or industrial waste water, purified waste water, surface water, especially surface water for use as tap water, sea water, polluted sea water, or other aqueous systems containing biodegradable material as defined herein.

As used herein, the term "waste water" is used as a common designation for aqueous effluents containing organic and/or inorganic substances which are present or formed in an environment as a consequence of the presence and/or activity of human beings, including industrial activity in its widest sense which e.g. comprises domestic and industrial activity, agriculture, forestry and fishing industry and which it is desired to treat so as to obtain purified water with the main purpose of maintaining and/or improving the environment and/or to provide a production of purified water which can be re-used as tap water. Typically, waste water is produced constantly or seasonally.

The expression "simultaneous effective nitrification and denitrification" is intended to denote that the aqueous medium is subjected to a biodegradation by the microorganisms which results in the simultaneous production of 1) nitrates from nitrogen-containing substances and 2) gaseous nitrogen from the nitrates.

The term "effective" in this context denotes that the final result should be that the aqueous medium has a total nitrogen concentration after biodegradation of at most 8 mg/l.

According to the invention the microorganisms are all subjected to substantially the same conditions (i.e. the metabolic level is sought kept at substantially the same level in all parts of the aqueous medium) meaning that there is no intentional physical division of the aqueous medium into e.g. zones of high and low oxygen concentration, respectively, as is the case in the prior art methods.

Therefore, when a purification process is controlled according to the invention in e.g. an aeration tank in a waste water purification system, the two reactions of nitrification and denitrification take place not only at the same time, but they also take place in parallel in the tank. Thus, in contrast to the known methods for the simultaneous nitrification and denitrification, the tank is not divided into zones which favours either of the two processes of nitrification or denitrification. In other words, the living conditions of the microorganisms in the system are sought to be kept substantially identical in the entire volume of the container (or at least in the part of the container where the biodegradation takes place) and thereby it is attempted to maintain an even distribution of the metabolic activity of the flocs of microorganisms all over the container.

By the expression "microorganisms" is herein meant organisms such as autotrophic as well as heterotrophic and aerobic, anaerobic or facultative bacteria, as well as lower eucaryotic organisms such as protozoa, yeasts, fungi, and other organisms usually present in activated sludge in the biological treatment step of a waste water purification plant, for example multicellular organisms such as slipper animalcule (Paramaecium) and parasites, especially bacteria-consuming parasites.

In the art of waste water purification, the microbial system used in the biological treatment steps is normally a mixed culture of microorganism. The term "mixed cultures of microorganisms" as used herein refers to cultures comprising a plurality, normally a wide variety, of species of microorganisms as defined above. The terms "activated sludge" or "biomass" are conventionally used for mixed cultures of microorganisms as defined above which are present in the biological treatment step in order to degrade the biodegradable material, i.e. especially decomposable organic and/or inorganic matter. Such mixed cultures of microorganisms utilize the nutrition in the waste water to be treated and thereby convert organic and inorganic matter to biomass and to end products of metabolism such as nitrates, nitrogen, sulphates, phosphates, carbon dioxide etc. This conversion can take place under anaerobic, aerobic or anoxic conditions. The actual composition of the mixed cultures of microorganisms may vary widely since the composition is highly dependent on the prevailing conditions.

The term "metabolic activity" as used herein, refers to the rate of metabolism of the microorganisms which are biodegrading biodegradable material, i.e. the metabolic activity is a quantitative measure of microbial activity. However, the term "metabolic activity" also encompasses a qualitative measure of microbial activity. In short, two ways exist of utilizing energy resulting from biodegradation, an anabolic and a catabolic. When the microorganisms are in an anabolic state (i.e. the supplies of nourishment are not limiting for the growth of the microorganisms), they metabolize in order to proliferate, i.e. the energy made available to the microorganisms is converted into biomass. Alternatively, when the microorganisms are in a catabolic (starved) state, they metabolize in order to produce e.g. enzymes in order for them to further degrade the biodegradable material, or in other words: In order to survive, substantially all efforts of the microorganisms are aimed at extracting energy from the biodegradable material.

It will be understood that the method of the invention for controlling biodegradation is aimed at providing a favourable metabolic activity of the microorganisms, i.e. a catabolic state of the microorganisms which is resulting in a high rate of biodegradation (only small amounts of energy are "wasted" in the anabolic metabolism of the microorganisms).

However, in order to achieve the second goal of the invention, namely to provide a simultaneous nitrification and denitrification of the biodegradable material, it is necessary to control parameters in the environment of the microorganisms in such a way that this is possible. It is believed that the method of the invention for controlling biodegradation has as a result that an optimum or near optimum balance is reached between 1) biodegradation of nitrogen-free components of the biodegradable material, 2) nitrification of nitrogen-containing components of the biodegradable material, and 3) denitrification of the nitrates produced as a result the nitrification. It is further believed that this optimum or near optimum balance is achieved because the living conditions of different subsets of microorganisms in the total population of microorganisms become adjusted by the method of the invention so that each subset perform its part of the biodegradation at a rate and efficiency which becomes optimized with respect to the biodegradation as well as the nitrification/denitrification. As the method of the invention aims at providing a stable environment for the microorganisms, and thus ensuring a stable level and quality of metabolic activity in the aqueous medium, it is further believed that the composition of the flocs of microorganisms becomes relatively stable with respect to the relative numbers of different subsets of species.

The expression "metabolic activity parameter" denotes a measurable parameter which can be assigned a value and which can provide information about the metabolic activity of the microorganisms. The expression "parameter which has influence on the metabolic activity of the microorganisms" denotes a controllable parameter which, when changed, has as a result that the metabolic activity of the microorganisms is changed. A metabolic activity parameter can also be called a "measured variable" or a "measured parameter" whereas a parameter which has influence on the metabolic activity of the microorganisms, when controlled, can be denoted a "controlled variable" or "controlled parameter".

Measured parameters and controlled parameters together are designated "process parameters".

It will be understood that a measured parameter and a controlled parameter may be the same. This is for instance the case when directly measuring the value of a controllable variable, such as is the case when measuring the oxygen concentration in the aqueous medium. If the oxygen concentration gets outside a concentration range which has been established to ensure a simultaneous effective nitrification and denitrification, the oxygen concentration will be adjusted to be inside the concentration range. In other cases the measured variable and the controlled variable are not the same, e.g. in cases where value of the measured variable provides an indirect indication of the metabolic activity of the microorganisms. As is discussed in detail herein, the fluorescence emission of biogenic fluorophores such as NADH and NADPH is a preferred metabolic activity parameter to be measured in the methods of the invention. However, in order to regulate the values of this parameter, other controlled parameters may be adjusted in the system, such as e.g. oxygen concentration, etc.

According to the invention, the measured parameter preferably is selected from the group consisting of $CO_2$ concentration, fluorescence emission from biogenic fluorophores, oxygen concentration, biomass concentration, oxygen concentration/COD ratio, biodegradable material loading, oxygen concentration, pH, temperature, turbidity, dosage rate of precipitation chemicals, dosage rate of additional readily biodegradable carbon-containing material, dosage rate of substances capable of converting not readily biodegradable material into readily biodegradable material, rate of recycling of activated sludge, inlet flow rate, outlet flow rate, stirring rate, oxygen dosage rate, air dosage (aeration) rate, total amount of activated sludge in the system, and other process parameters which are conventional in treatment processes of water, waste water or the like.

The assessment of the value of the measured parameter can be performed by methods known to the person skilled in the art. Examples of preferred methods are measurements selected from the group of measurements of fluorescence emission from at least one characteristic biogenic fluorophore, gaschromatographic measurements, infrared measurements, turbidity measurements, NMR measurements, chemical measurements of ammonium, phosphates and nitrates, measurements of redox potential, short-term measurements of BOD, and chromatographic measurements such as HPLC and FPLC, and combinations thereof. The chromatographic measurements can involve principles such as size-exclusion chromatography, affinity chromatography, ion-exchange chromatography etc.

When assessing the value of the measured parameter, it is preferred that this assessment is performed by the help of an on-line measurement, as this render possible a continuous surveillance of the processes and as fast action may be taken (for instance by automatization) when the measured parameter falls outside the predetermined range or is different from the predetermined value.

As used herein, the term "on-line measurement" denotes measurements having short response times, that is the numerical value or electrical signal obtained as a result of the actual measurement is recorded substantially momentarily with respect to the process.

The term "on-line automatization system" is intended to denote a system comprising on-line measurement equipment which is connected to effector equipment capable of controlling a process parameter. The effector equipment is fed with the information from the on-line measurements and controls the process parameter in an automated manner which is dependent on the incoming signal. Typical such systems are negative feed-back systems wherein a registration of values of a measured parameter indicating a change of a controlled parameter leads to the automatic regulation of the controlled parameter in the opposite direction of the observed change. According to the invention it is preferred that control of controlled parameters is effected by an on-line automatization system. However, manual or semi-manual surveillance of measured parameters and subsequent manual or semi-manual adjustment of controlled parameters can of course be performed when the amount of resources allows this, especially in view of the fact that human beings in some situations will react more adequately to changes in certain measured parameters than would a fully automated system.

It is preferred to measure fluorescence emission from at least one characteristic biogenic fluorophore, as such measurements render possible simple, fast and reliable retrieval of data regarding the metabolic state of the microorganisms. It is especially preferred to use on-line fluorescence sensor equipment.

As used herein, the term "biogenic fluorophore" denotes a substance synthesized by living material (living cells), the molecules of such a substance being capable of fluorescing when irradiated with light. Biogenic (biological) fluorophores include proteins, especially tryptophan- and tyrosine-containing proteins, tryptophan- and tyrosine-containing peptides, tryptophan- and tyrosine-containing derivatives of amino acids, co-factors, purines, pyrimidines, nucleosides, nucleotides, nucleic acids, steroids, vitamins and others. In this context, NADH (nicotinamide adenine dinucleotide) and NAD(P)H are preferred examples of biogenic fluorophores. Other examples of biological substances capable of fluorescing are tyrosine, tryptophan, ATP (adenosine triphosphate), ADP (adenosine diphosphate), adenine, adenosine, estrogens, histamine, vitamin A, phenylalanine, p-aminobenzoic acid, dopamine (3,4-dihydroxyphenylethylamine), serotonin (5-hydroxytryptamine), dopa (3,4-dihydroxyphenylalanine), kynurenine and vitamin B12.

The term "fluorescence" or the term "fluorescence emission" refers to the emission of radiant energy by a molecule or ion in the excited state. The molecule or ion reaches the excited state by absorption of radiant energy. Absorption of (or excitation by) ultra-violet or visible radiation causes an electronic transition (in $10^{-18}$ sec.) so that the molecule is excited from the electronic ground state to some vibrational sublevel of the first electronic excited state. This absorption of light is usually referred to as excitation. After excitation, the molecule must emit a quantity of energy equivalent to that absorbed if it is to return to the electronic ground state. This energy can take several forms, for example light, heat, etc. When said quantity of energy is emitted as light having longer wavelengths (lower energy) than the wavelengths of the light used for excitation and the time scale for this emission of light is approximately $10^{-8}$ sec., then such emission is denoted fluorescence.

Each biochemical or chemical molecule (biogenic fluorophore) has a characteristic excitation and fluorescence spectrum. Usually, the fluorescence spectrum or fluorescence band is split into two or more peaks or maxima, each peak occurring at a specific wavelength. To detect the fluorescence emission of a fluorescing molecule, it is a necessity to detect this emission at a wavelength which is within the envelope of the fluorescence band for the fluorophore, preferable at a wavelength corresponding to a peak in the fluorescence spectrum. Also, the fluorophore should be irradiated with light emitted at a wavelength which is within the envelope of the excitation band for the fluorophore, preferably at a wavelength corresponding to a peak in the excitation band.

The term "characteristic" as used in connection with biogenic fluorophore(s) denotes that the biogenic fluorophore is one which is inherently produced by the living biological material in question, i.e. the mixed culture of microorganisms, in an amount reflecting the biological activity, for example the metabolic activity, of the living material. Typically, the biogenic fluorophores are present as intracellular substances in the microorganisms.

The excitation peak and fluorescence peak, respectively, of important examples of the above-mentioned fluorophores appear from Table I below:

TABLE I

Examples of Biologically Important Fluorescent Substances

| | Excitation Peak (nm) | Fluorescence Peak (nm) |
|---|---|---|
| * tyrosine | 275 | 303 |
| 3,4-dihydroxyphenylalanine | 345 | 410 |
| * tryptophan | 287 | 348 |
| kynurenine | 370 | 490 |
| 5-hydroxytryptamine (serotonin) | 295 | 330 |
| phenylalanine | 260 | 282 |
| 3,4-dihydroxyphenylethylamine (dopamine) | 345 | 410 |
| histamine | 340 | 480 |
| vitamin A | 372 | 510 |
| flavins | 450 | 535 |
| NADH & NAD (P) H | 340 | 460 |
| p-aminobenzoic acid | 294 | 345 |
| vitamin B12 | 275 | 305 |
| estrogens | 285 | 325 |
| ATP, ADP, adenine, adenosine | 272 | 380 |

* Responsible for protein fluorescence

It is preferred that in the practical use of the method of the invention, the light is emitted at a wavelength longer than 250 nm, especially 250 nm–780 nm, for example about 340 nm, and fluorescence emission is detected at wavelengths longer than 250 nm, preferably 250 nm–800 nm, especially 280–500 nm, for example about 460 nm.

The light with which the system is irradiated is suitably light emitted at a wavelength longer than 250 nm, and the fluorescence emission is preferably detected at a wavelength of 280–500 nm. The wavelength should of course be adapted to the particular system, in particular the kind of fluorophores present in the system.

In accordance with what is indicated above, important embodiments of the method are embodiments wherein the fluorophore is a nicotinamide adenine dinucleotide such as NADH or NADPH. In this case, the light is preferably emitted at a wavelength of about 340 nm, and said fluorescence emission is detected at a wavelength of about 460 nm. One reason for putting much weight on measurements of these two fluorophores is, that they are very susceptible to changes in the concentration of their oxidized counterparts $NAD^+$ and $NADP^+$; even a fractional decrease in $NAD^+$ leads to a many fold increase in the concentration of NADH. Further, the concentration of NADH and $NAD^+$ taken together in living cells is about 1 mM, corresponding to approximately 0.63 g/l of cells, meaning that a significant percentage of the dry matter in cells is comprised of NADH and $NAD^+$.

By using fluorescence measurements of NADH/NADPH it is possible to obtain information concerning the biological potential activity (BPA) of the microorganisms. One unit of BPA is defined as the intensity of fluorescence corresponding to the fluorescent intensity recorded from a solution of distilled water containing 1 ppb coumarin at room temperature and atmospheric pressure.

When predetermining the range of values or the single value of the measured parameter, it is according to the invention normal practice to employ empirical calibration, i.e. a biodegradation process is monitored with respect to its input and output values of parameters of interest, and at the same time values of the measured parameter are recorded. The predetermined value(s) is/are those which will lead to a satisfactory result. As an example can be mentioned that a waste water purification process can be monitored with respect to its output of total nitrogen and BOD or COD. According to Danish legislation, the content of total nitrogen in purified waste water should not exceed 8 mg/l and BOD should not exceed 15 mg/l. Therefore, when predetermining the range of values or the single value of the measured parameter, the values of interest are those which are correlated with such low values of nitrogen and BOD concentrations. In order to optimize the choice of values of the measured parameter further, measurements of other process parameters such as energy requirements, rate of biodegradation etc. can be incorporated in the evaluation as well.

Hence, in the practical use of the method, it is often preferred to monitor the values of the measured parameter(s) of the system during an initial trial period and carefully monitoring the effect of increasing or decreasing treatment to reduce the biodegradable material, partly on the system proper and partly on the measured value, thus establishing correlation between the effect and interaction between controlled parameters, the condition of the system proper and the measured parameter, so as to identify the predetermined values with the highest accuracy.

Preferred controlled parameters are according to the invention selected from the group consisting of biodegradable material loading, oxygen concentration, pH, temperature, turbidity, dosage rate of precipitation chemicals, dosage rate of additional readily biodegradable carbon-containing material, dosage rate of substances capable of converting not readily biodegradable material into readily biodegradable material, rate of recycling of activated sludge, inlet flow rate, outlet flow rate, stirring rate, oxygen dosage rate, air dosage (aeration) rate, total amount of activated sludge in the system, concentration of activated sludge in the aqueous medium, and other process parameters which are conventional in treatment processes of water, waste water or the like. All of these controlled parameters are well-known in the art as are the means of effecting their direct control.

Depending on the microorganisms which are present in the biodegradation, it may be necessary to adjust pH of the biological system to be treated so as to obtain optimum or near optimum decomposition conditions. Generally, it is preferred that the pH of the biological system to be treated is within the range of 6–9 as this range will be tolerated by most microorganisms. In most cases the preferred pH-range is 7–8. If possible, also the temperature of the biological system to be treated should be adapted to the microorganisms present. Most microorganisms tolerate temperatures within the range of 10–70° C.; psychrophilic microorganisms tolerate temperatures in the range of 5–25° C., mesophilic microorganisms tolerate temperatures in the range of 25–40° C., and thermophilic microorganisms tolerate temperatures in the range of 40–60° C. In some cases, it may be advantageous to add further nutrients to the aqueous medium to be treated in the biodegradation if these are deficient in certain essential or biodegradation enhancing substances.

A controlled biodegradable material loading of the biological step can be provided by a controlled chemical precipitation (settlement) of biodegradable material, especially biodegradable material in the form of colloid particles, in a chemical treatment step prior to the biological treatment steps. Such process control of the mentioned chemical treatment step is preferably based on on-line information about the metabolic activity in the biodegradation.

Also, a controlled biodegradable material loading of the biodegradation can be provided based on a qualitative assessment, preferably an on-line assessment, of the biodegradability of the aqueous biological system, e.g. the waste water, to be processed together with on-line information about the metabolic activity in the biodegradation, and relevant process parameters are adjusted according to the obtained information.

Of these controlled parameters, the concentration of activated sludge in the aqueous medium is of special interest:

One advantage gained by employing the method of the invention is that e.g. an aeration tank which is controlled according to the invention can become more flexible with respect to the loads of biodegradable material which can be biodegraded and the content of excess sludge can then be decreased. Furthermore, the sludge concentration in secondary sludge separation is therefore higher. This is due to the fact that the concentration of biomass in an aeration tank normally is between 3 and 7 kg/m$^3$, whereas the biodegradation processes which are controlled according to the present method can be performed at sludge concentrations in the concentration range as high as 10–20 kg/m$^3$ (cf. example 2). It is already known in the art that the "biosorption phenomenon" (i.e. sorption of organic matter by activated sludge without biodegradation) can account for removal of significant amounts of waste water, and it is also known that the properties of the activated sludge is an important parameter in this regard. The present findings indicate that biosorption is enhanced when the flocs of microorganisms are controlled according to the invention and that this phenomenon can account for the increased robustness of the systems with high sludge concentration. Therefore, the flocs of microorganisms can absorb large amounts of incoming biodegradable material in a relative short period of time and the controlled process thus becomes less sensitive to e.g. a high waste water load.

Thus, in a preferred embodiment of the inventive method for controlling the biodegradation, the concentration of activated sludge is adjusted so as to be at least 3 and at most 20 kg/m$^3$. It is preferred that the concentration of activated sludge in this range is at least 5 kg/m$^3$, such as at least 7 kg/m$^3$, 9 kg/m$^3$, 11 kg/m$^3$, 13 kg/m$^3$, 15 kg/m$^3$, 17 kg/m$^3$, and at least 19 kg/m$^3$.

It is also preferred that the concentration of biomass in the range 3 to 20 kg/m$^3$ is adjusted so as to be at most 18 kg/m$^3$, such as at most 16 kg/m$^3$, 14 kg/m$^3$, 12 kg/m$^3$, 10 kg/m$^3$, 8 kg/m$^3$, and at most 6 kg/m$^3$.

Hence, by using the methods of the invention, the metabolic capacity per volume unit is increased, as a higher concentration of microorganisms can be used. In this respect the control of the amount and viability of the microorganisms in the system becomes a very important parameter.

In this regard, the size of the flocs of microorganisms is especially important. In waste water purification processes, the microorganisms used for the biodegradation in aeration tanks tend to form flocs constituted of a number of different microorganisms (thus, the flocs are constituted of mixed cultures of microorganisms). The microorganisms secrete mucous extracellular substances which form an extracellular matrix wherein a number of substances are trapped and are either biodegraded (e.g. large biodegradable molecules) or effects biodegradation (enzymes secreted by the microorganisms). Also, poisonous and/or inhibitory substances are trapped in this extracellular matrix.

In biological waste water plants, the content of microorganisms (activated sludge) is normally separated from the water in a process tank or in a separate clarifier, where sedimentation takes place. A part of the sedimented biomass is then recirculated to the process tank in proportion to the chosen concentration of the active biomass in the process tank.

The biomass which is not recirculated to the process tank, is settled and dewatered (cf. FIG. 1, which shows a traditionally run recycling process of biomass).

During the settling phase, the active bacteria experience difficult living conditions causing the inactivation or death of a large proportion of them. Further, in the sedimentation phase there is practically no biodegradable material or oxygen present, the two fundamental constituents for a reasonable bacterial growth.

According to the invention it is of utmost importance to maintain the metabolic activity of the microorganisms in the aeration tank at a constant level which ensures effective biodegradation and a simultaneous effective nitrification and denitrification. Further, it is of great importance to increase the biological activity in the aeration tank by gaining a larger population of living microorganisms. Therefore, it is desired to avoid to subject the microorganisms to the stress which is part of a sedimentation process. This can, according to the invention, be achieved by separating active (viable) biomass from inactive biomass before the sedimentation process, and only recycling the active part of the biomass.

It is known that active microorganisms tend to form flocs of various sizes. However, the present inventors have discovered that the size and/or gravital density of a floc is related to its efficacy as a constituent in a water purification process and, very importantly, that this efficacy can be measured by evaluating the BPA of the flocs. Large and/or dense flocs tend to consist of more active microorganisms than do smaller flocs. Therefore, a separation process retaining the large or dense flocs (with a high BPA) and recycling these while removing the smaller or less dense flocs (with a low BPA) as excess sludge considerably improves the capacity of the purification process. However, any separation system of bioflocs can be enhanced by evaluating the BPA of the flocs retained in the separation and the flocs excluded by it, and it thus becomes possible to optimize such a separation process.

According to the invention it is therefore preferred that such a separation (e.g. based on size or density of the flocs) and recirculation of activated sludge (biomass) takes place before the excess sludge is sent to sedimentation.

It has been discovered by the present inventors that by assessing the BPA in the aeration tank (before the separation) and/or in the settlement tank (after the separation), it is possible to evaluate the separation of flocs (e.g. by their size or density), since a low BPA in the settlement phase and a high BPA in the aeration phase is an indication of an effective separation and recirculation of flocs with high BPA. According to the invention it is therefore especially preferred that the separation is controlled on the basis of such BPA-measurements, the optimum separation being one which maximizes the ratio between BPA in the aeration tank and BPA in the settlement tank. It is further believed that processes for sludge separation and/or recirculation which are controlled by evaluating BPA, are inventive in their own right.

The measurement of BPA can also be used to control the amount of returned activated sludge so as to keep the activated sludge concentration fairly constant in the aeration tank.

Figure 2:
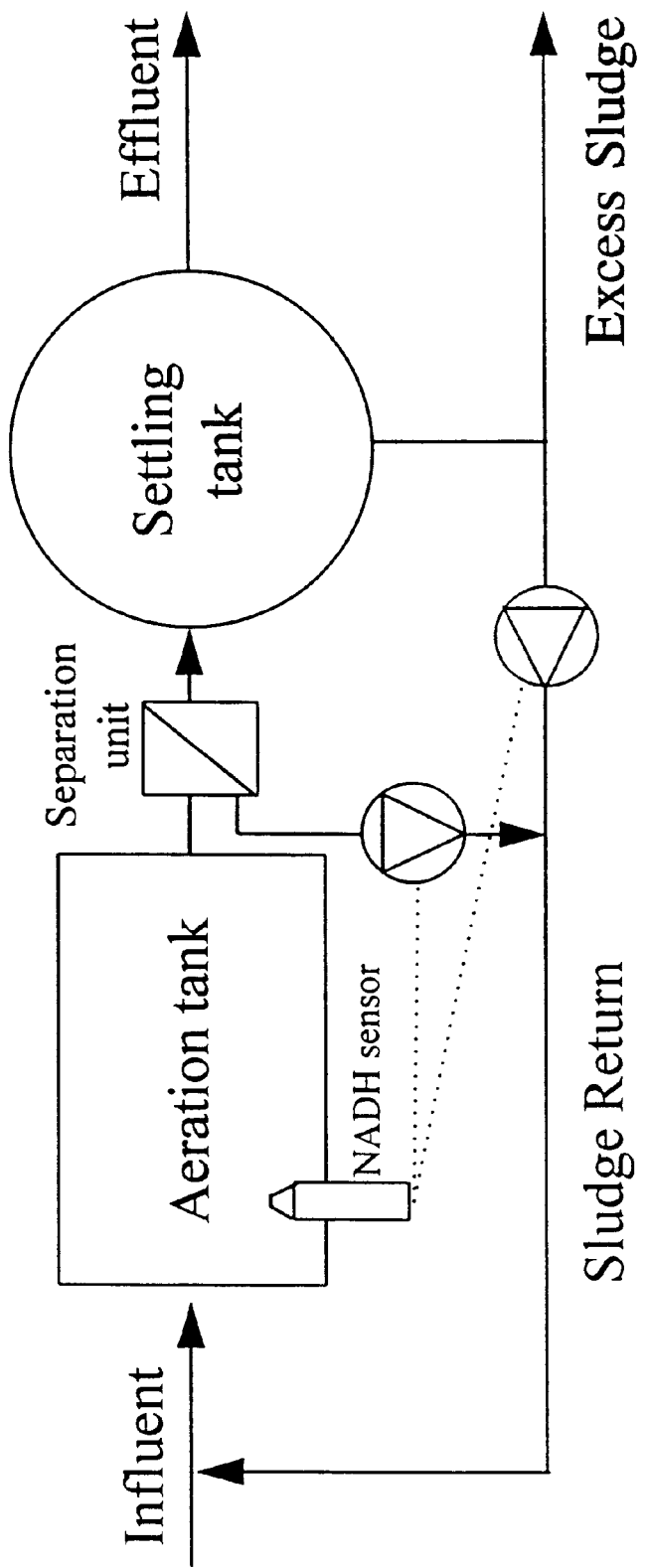

Referring to FIGS. 1 and 2, a separation system forming a part of the present invention is described in the following:

The prior art method of recycling of biomass (shown in FIG. 1) is adjusted on three major points in order to achieve the inventive separation/recycling:

Measuring equipment is installed in the aeration tanks. The measuring equipment is capable of indicating the potential activity of the microorganisms (BPA) as well as the load situation. The signal is used for monitoring and controlling the biomass return and thereby the biomass concentration in the aeration tank. By measuring the BPA in the aeration tank (and optionally in the settlement tank) the efficacy of the separation can be controlled as described above.

Further, a separation unit is introduced between the purification step in the aeration tank and the settlement tank; the separation unit can be placed in the aeration tank or in a separate position outside the aeration tank. The separation can be any suitable mechanical, physical or physiological system, such as a filtration system, a centrifugation system, cyclones, a membrane filtration system, a flotation system etc. A part of the biomass with high BPA reverts to the aeration tank, whereas excess sludge is directed to the settling tank and/or is separated by means of chemical precipitation, membrane filtration, sand filtration, or other methods known to the skilled person. In preferred embodiments, the separation system is adjustable, whereby it becomes possible to separate for flocs of different sizes in case the system changes, thus altering the size or density of "optimum flocs".

Finally, a measuring system is introduced for controlling the biomass separation system so as to obtain that the fraction of the highest possible BPA is returned to the aeration tank. The measuring system can be based on the BPA measurements as described above or it can simply be based on the floc size after the optimum floc size has been determined and it is believed that optimal floc size/density will not change.

By employing such separation of active from inactive biomass before the settling tank, the need for recirculation of sludge from the settling tank can be significantly reduced, even down to a zero recirculation. Further, the size-requirements in the settlement step diminishes, as less sludge is processed in this step. As a result of this, energy and investment savings are achieved.

According to the invention, other especially important controlled parameters are the oxygen concentration, oxygen dosage rate, and air dosage rate. As explained above, the method of the invention only proves efficient when the oxygen concentration in the aqueous medium is below 1 mg/l. Further, it has been found that oxygen concentrations above 0.1 mg/l normally secure that the nitrification process runs satisfactorily. Therefore, according to one aspect of the invention, the oxygen concentration is at least 0.1 mg/l, preferably at least 0.2 mg/l. Also according to the invention, the oxygen concentration is preferably at most 0.9, more preferably at most 0.8 and most preferably at most 0.7 mg/l. However, as superior results have been achieved at oxygen concentrations below 0.6 mg/l it is especially preferred that the oxygen concentration is adjusted to values below 0.6 mg/l, such as values below 0.5 or even below 0.4 mg/l.

As will be understood from the above, the essential idea which has made the present invention possible is the realization that it is possible to control the metabolic activity of microorganisms towards a certain set of values, and thereby achieving that the biodegradation effected by the microorganisms is effective simultaneously with an efficient nitrification/denitrification.

Therefore, another part of the invention is a method for purifying an aqueous medium containing biodegradable material which comprises nitrogen-containing components so as to substantially reduce the content of biodegradable material in the aqueous medium, the method comprising introducing the aqueous medium into a container wherein the biodegradable material contained in the aqueous medium is subjected to biodegradation by microorganisms and controlling the metabolic activity of said microorganisms in such a way that the biodegradation results in simultaneous effective nitrification and denitrification in substantially all parts of the container and that the oxygen concentration in the aqueous medium is kept below 1 mg/l while simultaneous effective nitrification and denitrification take place.

The term "container" is meant to denote any vessel capable of containing an amount of water which is subjected to biodegradation. Normally, the container will be e.g. an aeration tank in a waste water purification plant.

That the "biodegradation results in simultaneous effective nitrification and denitrification in substantially all parts of the container" is intended to mean that there is no intentional substantial subdivision of the container into aerated and less aerated vertical zones. This means that there will only be minor, insignificant variations in the average oxygen concentration in randomly chosen vertical cross-sections of the container where there is an effective concentration of flocs. Further, according to the invention the average oxygen concentration will preferably not exceed 1 mg/l in such vertical cross-sections in any part of the container.

By the expression "substantially reduce the content of biodegradable material in the aqueous medium" is herein meant that the concentration of biodegradable material is reduced to at most 20% of the initial concentration in the aqueous medium. It is preferred that the concentration of biodegradable material is reduced to at most 10%, such as at the most 5%, 2% or even 1% of the initial concentration. In the most preferred embodiment, the aqueous medium is converted to pure water by the process of the invention.

By the term "pure water" is meant water having a concentration of carbon-, nitrogen- and/or phosphor-containing components which are at such a low level that there is practically no such material available for further biological or microbiological growth in the purified water itself or in the recipients for the purified water. Any biological or microbiological growth in recipients of pure water is not caused by the admission of the pure water into the recipient. In terms of Biological Oxygen Demand BOD, Danish legislation has set an upper limit of 15 mg/l in the final effluent from waste water purification plants, i.e. for pure water, which can then serve as a practical numerical guideline for defining the term "pure water" herein. Regarding the content of suspended solids in purified water, it is possible to remove substantially all suspended solids from waste water by adding (an) additional separation process step(s), for example sand filter(s), to the total purification process.

It will be understood that the preferred way of controlling the metabolic activity of the microorganisms is to employ the methods of the invention for the control of biodegradation, and the invention therefore also relates to a method for purifying an aqueous medium containing biodegradable material which comprises nitrogen-containing components so as to substantially reduce the content of biodegradable material in the aqueous medium, the method comprising introducing the aqueous medium into a container wherein the biodegradable material contained in the aqueous medium is subjected to biodegradation by microorganisms, and controlling the biodegradation according to the methods of the invention for the control of biodegradation.

In fact, all the preferred embodiments discussed above in connection with the method for controlling biodegradation apply mutatis mutandis to the inventive methods for purifying an aqueous medium. This means that all the above-described embodiments relating to biomass concentration, measured parameters, controlled parameters, means for measuring parameters etc also relate to the method of the invention for purifying aqueous media.

When using the methods of the invention, the process volume used for biodegrading biodegradable material can be significantly reduced when compared to known standard procedures for biological waste water purification. As shown in example 2, a large-scale purification process was performed in a process volume which was only 25% of the process volume normally employed at that purification plant while maintaining the efficacy of the purification process. It is believed that further reductions can be obtained when using the method of the invention, as the 25% reduction in Example 2 was the maximum which could be achieved, simply because no further reductions in process volume could be accomplished in that particular purification plant (since there were no further aeration tanks to shut down).

The German standards ATV-A 122, 126 and 131 describe well-defined and broadly accepted standards for constructing and running activated sludge processes. Compared to these standards, the method for purifying an aqueous medium according to the invention has proved highly superior in a number of ways.

Therefore, another important aspect of the method of the invention for purifying waste water is one which has an activated sludge process volume of at most 80% of that of purification performed as described in any of the German standards ATV-A 122, ATV-A 126, or ATV-A 131, the standard method purifying a similar amount of waste water. In preferred embodiments the process volume is at most 70%, such as at the most 60%, 50%, or 40% of the standard purification process. It is especially preferred that the process volume is at most 30%, more preferably at most 25%, and most preferably 20%. It is expected that the minimum possible process volume will be at most 10% of that of one of the standard processes and this is the most preferred embodiment of this aspect of the invention.

A further advantage of the inventive methods is that the energy demand of the purification process is decreased. The smaller process volume has as a result that smaller volumes have to be aerated in order to keep the purification process going. It is well known in the art that aeration of waste water in e.g. aeration tanks is one of the most energy demanding processes in waste water purification.

In parallel with the above, the invention also relates to a method of the invention for purifying waste water, wherein energy required for purifying the aqueous medium is at most 90% of the energy required of a purification performed as described in any of the standards ATV-A 122, ATV-A 126, or ATV-A 131, the standard method purifying a similar amount of waste water. In preferred embodiments the energy requirement is at most 70%, such as at the most 60%, 50%, or 40% of the standard purification process. It is especially preferred that the energy required is at most 30%, more preferably at most 25%, and most preferably 20%. It is expected that the minimum possible energy required will be at most 10% of that of one of the standard processes and this is the most preferred embodiment of this aspect of the invention.

A number of further advantages than those described above are achieved by using the methods of the invention. First of all, the microorganisms become relatively insensitive to poisonous or inhibiting substances in the incoming water, probably because such substances are immobilised in the extracellular mucous substances constituting the "backbone" of the flocs; this process seems to be optimal, when the flocs are separated and recycled as described above, i.e. the flocs seem to function optimally in this respect when their size is the optimum with respect to biodegradation and nitrification/denitrification.

One paradox is that one of the above-mentioned "poisonous or inhibiting substances" is atmospheric oxygen (and of course the hyperreactive oxygen radicals such as O and $H_2O_2$). Thus, oxygen tends to assist in the undesired breakdown of the mucous backbone of the flocs thereby increasing the danger of bulking sludge formation when the flocs are made physically unstable and diminishes in size. In the prior art methods it is imperative to apply high oxygen tensions in order to effect nitrification and therefore the negative effects of oxygen could not be avoided, a drawback not suffered from the present invention. Thus, apart from the fact that the method of the invention ensures an optimized biodegradation in combination with a simultaneous nitrogen removal, the flocs of microorganisms are protected against degradation and thereby bulking sludge formation is inhibited.

This might be one of the reasons that the biomass is not "flushed out" even though the smaller process volume results in higher hydraulic loads. In other words, the biomass exhibits superior retention in the aeration tank when the tank is operated according to the methods of the invention. Hence, there is also a smaller risk of pollution of recipients resulting from biomass loss from clarifiers, even in the situations were the purification process is subjected to large hydraulic loads (after and during heavy rain etc.).

Also, the costs for constructing new waste water purification plants will be diminished, as smaller plants are needed when the methods of the invention are used. Another advantage is that existing plants will become more flexible, as they can be subjected to higher loads, and as tanks which normally are dimensioned only for nitrification become capable of denitrification, too.

All these advantages add up to the conclusion that the costs for producing one cubic meter of purified water can be significantly lowered, thereby making effective waste water purification accessible and economically realistic for e.g. third-world countries.

The above discussed methods of the invention can of course be combined with all conventional methods of optimizing biodegradation or waste water purification as such. The skilled person will know how to combine the present method improvements with the existing waste water purification methods, but a review of the possibilities can be found in EP-B-461166 (U.S. Pat. No. 5,506,096).

It will be understood that the results obtained by using the methods of the invention are greatly dependent on the accurate determination of the range of values or the single value of the at least one metabolic activity parameter which indicate that the microorganisms will perform a simultaneous effective nitrification and denitrification of the biodegradable material.

Hence, the invention also relates to a method for determining a range of values or a single value of a metabolic activity parameter which represents metabolic activity of microorganisms which biodegrade biodegradable material in an aqueous medium, the biodegradable material comprising nitrogen-containing components, the values in the range or the single value being ones which indicate that the microorganisms will perform a simultaneous effective nitrification and denitrification of the biodegradable material contained in the aqueous medium, the method comprising assessing values of the metabolic activity parameter and at the same time assessing efficacy of biodegradation and efficacy of nitrogen removal (as discussed above in relation to the predetermination of values), and selecting, as the values in the range or as the single value, the values which are associated with simultaneous effective biodegradation and nitrogen removal at oxygen concentrations below 1 mg/l.

By the term "simultaneous effective biodegradation and nitrogen removal" is meant a simultaneous reduction of BOD and total nitrogen down to values below 15 mg/l and 8 mg/l, respectively.

Finally, a fourth part of the invention is a water purification plant, wherein at least one purification process which comprises a biodegradation step is performed according to the methods of the invention for purifying aqueous media or wherein the biodegradation is controlled according to the method of the invention for controlling biodegradation.

EXAMPLES

Example 1

Small-scale operation performed according to the invention.

The method of the invention was investigated by changing the operation of the purification plant in Nr. Herlev, Denmark, from a standard operation to the method of the invention for waste water purification.

The plant is designed as a single line with an aeration tank and a clarifier. The standard process originally used in the tank was a nitrification process, wherein the aeration tank was aerated from the surface and the aeration was regulated with a rotor. The oxygen levels were constantly between 2 and 4 mg/ml and the biomass concentration was 3–4 kg/m$^3$.

The plant is dimensioned for 700 personal equivalents (PE). The aeration tank has a volume of 200 m$^3$ and the clarifier has a volume of 85 m$^3$.

BioBalance® sensors (available from BioBalance A/S, Vallensbæk, Denmark and disclosed in detail in EP-A-641, 431) were installed in the plant. The BioBalance® sensors measured the fluorescent emission from microbial NADH and NADPH at 460 nm after excitation with light at 340 nm. As described in EP-B-461166 and U.S. Pat. No. 5,506,096, it is possible to monitor the metabolic activity of microorganisms present in an aqueous system such as an aeration tank by measuring fluorescent emission from e.g. NADH in the microorganisms and the results from such measurements can then be used as measured variables in an on-line automatization system, wherein process variables are controlled in a direction which ensures an optimum biodegradation by the microorganisms.

For a period of 3 weeks the daily operation (performed by the standard method) was monitored,, i.e. the process parameters oxygen, COD, BOD, flow, temperature, pH, concentrations of sludge (concentration of suspended solids), ammonium, nitrate, nitrogen and phosphate, and energy consumption were recorded using standard methods known in the art at different points in the purification process as was the fluorescence of NADH.

It was then decided to operate the plant by continuously adjusting the oxygen concentration towards values which directed subsequent fluorescence measurements towards the average fluorescence value (250 BPA) which had been recorded during the 3 weeks and in this way the process was modified to the method of the invention for controlling the biodegradation.

Following the modification, the aeration tank performed a simultaneous nitrification and denitrification at an oxygen level which never was outside the range between 0.1 and 0.3 mg/l. The oxygen level was controlled automatically as a response to oscillations in fluorescence from NADH in the tank.

The concentration of activated sludge was kept at a level of 3–4 kg/m$^3$ after the modification.

During the experimental period, the concentrations of compounds of interest in the inlet and outlet of the plant was monitored by daily sampling and subsequent laboratory analysis (performed by standard methods known in the art). The results of this monitoring were the following:

Inlet values
    Volume: 250 m$^3$/day
    COD: 200 mg/l
    Nitrogen: 30 mg/l
Outlet values of nitrogen before the change of process
    Total N: ~20 mg/l
    NO$_3$: ~20 mg/l
Outlet values of nitrogen after the change of process
    Total N: ~6 to ~8 mg/l
    NH$_4$: ~1 mg/l
    NO$_3$: ~5 to ~7 mg/l The outlet was further monitored by NADH florescence measurements which were performed on-line during the operation. The outlet measurements (both laboratory values and fluorescence values) were not influenced by the inlet values, a fact which is proof of the flexibility of the method of the invention.

Discussion

By using the methods of the invention in this small-scale waste water purification, a process which had been adapted only to nitrification of waste water was now capable of performing a simultaneous nitrification and denitrification. This fact is evidenced by the reduced outlet of nitrogen (a reduction to 30%–40% of the original Nitrogen concentration) after the initiation of the method of the invention.

Example 2

Large-scale operation performed according to the invention.

The method of the invention was investigated by changing the operation of the municipal purification plant in Hecklingen, Germany, from a standard operation (as described in ATV-A 131) to the method of the invention for waste water purification.

The plant is designed as two parallel lines, each with a selector in front, two aeration tanks and one clarifier. The process originally used in the tank was a biodenipho process (an alternating nitrification and denitrification process disclosed i.a. in DE patent no. 34,273,107) wherein nitrogen was removed in the nitrification phase at oxygen levels of 1.5 to 2 mg/ml followed by a denitrification phase at an oxygen level of about 0 mg/l.

The dimensioning of the plant was based on ATV-A 131 and was designed for 48,000 personal equivalents (PE) each line was designed for 24,000 PE, and each aeration tank was thus dimensioned for 12,000 PE.

BioBalance® sensors (available from BioBalance A/S, Vallens-bækvej 45, 2605 Brøndby, Denmark) were installed in the plant. The BioBalance® sensors measured the fluorescent emission from microbial NADH and NADPH at 460 nm after excitation with light at 340 nm. As described in EP-B-461166, it is possible to monitor the metabolic activity of microorganisms present in an aqueous system such as an aeration tank by measuring fluorescent emission from e.g. NADH in the microorganisms and the results from such measurements can then be used as measured variables in an on-line automatization system, wherein process variables are controlled in a direction which ensures an optimum biodegradation by the microorganisms.

For a period of three months the daily operation (performed by the standard method) was monitored, i.e. the process parameters oxygen, COD, BOD, flow, temperature, pH, concentrations of sludge (concentration of suspended solids), ammonium, nitrate, nitrogen and phosphate, and energy consumption were recorded using standard methods known in the art at different points in the purification process as was the fluorescence of NADH.

It was then decided to operate the plant by shutting down three of the four aeration tanks, thereby reducing the aeration volume from the original 4 tanks of 15,600 m$^3$ in total to one tank of 3,900 m$^3$. The single tank was operated by continuously adjusting the oxygen concentration towards values which directed subsequent fluorescence measurements towards the average fluorescence value (BPA) which had been recorded during the three months and in this way the process was modified to the method of the invention for controlling the biodegradation.

Following the modification, the aeration tanks were thus using one phase only (with a simultaneous nitrification and denitrification) at an oxygen level which never was outside the range between 0.2 and 0.6 mg/l. The oxygen level was controlled automatically as a response to oscillations in fluorescence from NADH in the tank.

The effective load of the plant was about 30,000 PE, which means that the capacity of the aeration tank which was operated according to the invention was 2.5 times higher than the calculated capacity.

The concentration of activated sludge was kept at a level of 15 kg/m$^3$, a value three times higher than the standard value according to ATV-A 131.

During the experimental period, the concentrations of compounds of interest in the inlet and outlet of the plant was monitored by daily sampling and subsequent laboratory analysis (performed by standard methods known in the art). The results of this monitoring were the following:

Inlet values
    COD: 300 to 1100 mg/l
    Nitrogen: 25 to 65 mg/l
    Phosphorous: 3 to 8 mg/l
Outlet values
    COD$_{max}$: 25 mg/l
    COD$_{avg}$: 15 mg/l
    NH$_3$: 0.05 to 2 mg/l
    NO$_3$: 0.05 3 mg/l
    P: less than 1 mg/l The outlet was further monitored by NADH florescence measurements which were performed on-line during the two months of operation. The outlet measurements (both laboratory values and fluorescence values) were not influenced by the inlet values, a fact which is proof of the flexibility of the method of the invention.

Discussion

By using the method of the invention in this large-scale waste water purification, the process volume was decreased to 25% of the process volume normally used in the plant while the efficacy of the purification was maintained at the level normally observed during standard full-scale operation. Further, even though the operation was performed in this minor process volume, the outlet values of compounds of interest were not sensitive to the daily changes in load.

The choice of the average NADH fluorescence value from the prior recordings is not necessarily the optimum value. In order to determine the optimum operational value of the fluorescence, the system can be fine-tuned by monitoring the biodegradation as discussed above when using other fluorescence set-points.

We claim:

1. A method for controlling biodegradation of biodegradable material which comprises nitrogen-containing components, the biodegradable material being contained in an aqueous medium and the biodegradation being effected by microorganisms, the method comprising assessing the value of at least one metabolic activity parameter which represents metabolic activity of the microorganisms which biodegrade the biodegradable material in the aqueous medium, comparing the assessed value with a predetermined range of values or a predetermined single value of the at least one measured parameter, the values in the range or the single value being ones which indicate that the microorganisms will perform a simultaneous effective nitrification and denitrification of the biodegradable material contained in the aqueous medium, and thereafter if the assessed value falls outside the range or is different from the single value, adjusting at least one parameter which has influence on the metabolic activity of the microorganisms in a direction that 1) moves subsequent assessed values into the range or towards the single value and 2) ensures that the oxygen concentration substantially throughout the aqueous medium is kept below 1 mg/l while simultaneous effective nitrification and denitrification take place.

2. A method according to claim 1, wherein the at least one controlled parameter is adjusted in a direction which moves subsequent assessed values towards one specific value in the range.

3. A method according to claim 1, wherein the values in the range or the single value have been predetermined by empirical calibration.

4. A method according to claim 1, wherein the measured parameter is selected from the group consisting of oxygen concentration, biomass concentration, oxygen concentration/COD ratio, $CO_2$ concentration, fluorescence emission from characteristic biogenic fluorophores, biodegradable material loading, oxygen concentration, pH, temperature, dosage rate of additional readily biodegradable carbon-containing material, dosage rate of substances capable of converting not readily biodegradable material into readily biodegradable material, rate of recycling of activated sludge, oxygen dosage rate, air dosage rate, total amount of activated sludge in the system, and concentration of activated sludge in the aqueous medium.

5. A method according to claim 4, wherein the biogenic fluorophore is selected from the group consisting of tryptophan- and tyrosine-containing proteins, tryptophan- and tyrosine-containing peptides, tryptophan- and tyrosine-containing derivatives of amino acids, purines, pyrimidines, nucleosides, nucleotides, nucleic acids, steroids and vitamins.

6. A method according to claim 5, wherein said measurement is carried out using on-line fluorescence sensor equipment.

7. A method according claim 4, wherein the biogenic fluorophores are excited with excitation light of a wavelength longer than 250 nm.

8. A method according to claim 7, wherein said excitation light is emitted at a wavelength which is within the envelope of the excitation band for said fluorophore and said fluorescence emission is detected at a wavelength which is within the envelope of the fluorescence band for said fluorophore.

9. A method according to claim 7, wherein fluorescence emission is detected at a wavelength of 280–500 nm.

10. A method according to claim 4, wherein said fluorophore is a nicotinamide adenine dinucleotide.

11. A method according to claim 10, wherein excitation light is emitted at a wavelength of about 340 nm, and fluorescence emission is detected at a wavelength of about 460 nm.

12. A method according to claim 10, wherein the fluorophore is NADH or NADPH.

13. A method according to claim 1, wherein the assessment of the measured parameter comprises measurements selected from the group of measurements of fluorescence emission from at least one characteristic biogenic fluorophore, chemical measurements of ammonium, phosphates and nitrates, measurements of redox potential, and short-term measurements of BOD and combinations thereof.

14. A method according to claim 1, wherein the assessment of the measured parameter is performed by on-line measurement of the measured parameter.

15. A method accordindg to claim 1, wherein the controlled parameter is selected from the group consisting of biodegradable material loading, oxygen concentration, pH, temperature, turbitidy, dosage rate of precipitation chemicals, dosage rate of additional readily biodegradable carbon-containing material, dosage rate of substances capable of converting not readily biodegradable material into readily biodegradable material, rate of recycling of activated sludge, inlet flow rate, outlet flow rate, stirring rate, oxygen dosage rate, air dosage rate, total amount of activated sludge in the system, and concentration of activated sluddge in the aqueous medium.

16. A method according to claim 15, wherein the concentration of biomass is adjusted so as to be at least 3 and at most 20 kg/m$^3$.

17. A method according to claim 16, wherein the concentration of biomass is adjusted so as to be at least 11 kg/m$^3$.

18. A method according to claim 15, wherein the at least one parameter which has influence on the metabolic activity of the microorganisms is the oxygen concentration, oxygen dosage rate, or air dosage rate.

19. A method according to claim 18, wherein the oxygen concentration is adjusted so as to be at most 0.9 mg/l.

20. A method according to claim 18, wherein the oxygen concentration is adjusted so as to be at least 0.1 mg/l.

21. A method according to claim 1, wherein adjustment of the at least one parameter which has influence on the metabolic activity of the microorganisms is effected by an on-line automatization system.

22. A method for purifying an aqueous medium containing biodegradable material which comprises nitrogen-containing components so as to substantially reduce the content of biodegradable material in the aqueous medium, the method comprising introducing the aqueous medium into a container wherein the biodegradable material contained in the aqueous medium is subjected to biodegradation by microorganisms, and controlling the biodegradation according to the method in claim 1.

23. A method for purifying an aqueous medium containing biodegradable material which comprises nitrogen-containing components so as to substantially reduce the content of biodegradable material in the aqueous medium, the method comprising introducing the aqueous medium into a container wherein the biodegradable material contained in the aqueous medium is subjected to biodegradation by microorganisms and controlling the metabolic activity of said microorganisms in such a way that the biodegradation results in simultaneous effective nitrification and denitrification is substantially all parts of the container and that the oxygen concentration substantially throughout the aqueous medium is kept below 1 mg/l while simultaneous effective nitrification and denitrification take place.

24. A method according to claim 23, wherein control of the biodegradation is performed by:

assessing the value (assessed value) of at least one metabolic activity parameter (measured parameter) which represents metabolic activity of the microorganisms which biodegrade the biodegradable material in the aqueous medium, comparing the assessed value with a predetermined range of values or a predetermined single value of the at least one measured parameter, the values in the range or the single value being ones which indicate that the microorganisms will perform a simultaneous effective nitrification and denitrification of the biodegradable material contained in the aqueous medium, and thereafter if the assessed value falls outside the range or is different from the single value, adjusting at least one parameter (controlled parameter) which has influence on the metabolic activity of the microorganisms in a direction that 1) moves subsequent assessed values into the range or towards the single value and 2) ensures that the oxygen concentration in the aqueous medium is kept below 1 mg/l while simultaneous effective nitrification and denitrification take place.

25. A method according to claim 23, wherein the microorganisms are a mixed culture of microorganisms.

26. A method for determining a range of values or a single value of a metabolic activity parameter which represents metabolic activity of microorganisms which biodegrade biodegradable material in an aqueous medium, the biodegradable material comprising nitrogen-containing components, the values in the range or the single value being ones which indicate that the microorganisms will perform a simultaneous effective nitrification and denitrification of the biodegradable material contained in the aqueous medium, the method comprising assessing values of the metabolic activity parameter and at the same time assessing efficacy of biodegradation and efficacy of nitrogen removal, and selecting, as the values in the range or as the single value, the values which are associated with simultaneous effective biodegradation and nitrogen removal at oxygen concentrations below 1 mg/l substantially throughout the aqueous medium.

27. A water purification plant comprising: means for controlling biodegradation of biodegradable material which comprises nitrogen-containing components, the biodegradable material being contained in an aqueous medium, the biodegradation being effected by microorganisms, and said means for controlling biodegradation comprising:

means for assessing the value of at least one metabolic activity parameter which represents metabolic activity of the microorganisms which biodegrade the biodegradable material in the aqueous medium, means for comparing the assessed value with a predetermined range of values or a predetermined single value of the at least one measured parameter, the values in the range or the single value being ones which indicate that the microorganisms will perform a simultaneous effective nitrification and denitrification of the biodegradable material contained in the aqueous medium, and means for adjusting at least one parameter which has influence on the metabolic activity of the microorganisms in a direction that 1) moves subsequent assessed values into the range or towards the single value and 2) ensures that the oxygen concentration substantially throughout the aqueous medium is kept below 1 mg/l while simultaneous effective nitrification and denitrification take place, if the assessed value falls outside the range or is different from the single value.

* * * * *